US012312864B1

(12) United States Patent
Hu

(10) Patent No.: US 12,312,864 B1
(45) Date of Patent: May 27, 2025

(54) CONNECTING ROD STABILIZING STRUCTURE FOR HERRINGBONE LADDER

(71) Applicant: Qiulan Hu, Zhejiang (CN)

(72) Inventor: Qiulan Hu, Zhejiang (CN)

( * ) Notice: Subject to any disclaimer, the term of this patent is extended or adjusted under 35 U.S.C. 154(b) by 0 days.

(21) Appl. No.: 19/022,168

(22) Filed: Jan. 15, 2025

(30) Foreign Application Priority Data

Dec. 30, 2024 (CN) ......................... 202411975243.7

(51) Int. Cl.
*E06C 7/42* (2006.01)
*E06C 1/18* (2006.01)
*E06C 7/50* (2006.01)

(52) U.S. Cl.
CPC ................ *E06C 7/423* (2013.01); *E06C 1/18* (2013.01); *E06C 7/50* (2013.01)

(58) Field of Classification Search
CPC ............... E06C 7/423; E06C 1/18; E06C 7/50
USPC .......................................................... 182/104
See application file for complete search history.

(56) References Cited

U.S. PATENT DOCUMENTS 992,915 A * 5/1911 Shaw ........................ E06C 1/22 182/167
4,457,391 A * 7/1984 Alimbau Marques .... E06C 1/52 182/164
4,574,918 A * 3/1986 Marques ................... E06C 1/52 182/164
4,815,564 A * 3/1989 Yoo ........................... E06C 1/32 182/163
5,577,574 A * 11/1996 Joseph ...................... E06C 7/42 182/174
5,722,507 A * 3/1998 Kain ....................... E06C 1/393 182/104
6,073,726 A * 6/2000 McCrystal ................ E06C 1/22 182/195
8,186,481 B2 * 5/2012 Moss ........................ E06C 7/14 182/25
8,381,875 B2 * 2/2013 Leng ....................... E06C 7/087 182/180.1
9,151,115 B1 * 10/2015 Forte, Jr. ................. E06C 7/188
9,534,443 B1 * 1/2017 Bogart ...................... E06C 7/44
10,208,538 B2 * 2/2019 Astor ........................ E06C 1/18
10,487,576 B2 * 11/2019 Ballard ..................... E06C 1/22

(Continued)

FOREIGN PATENT DOCUMENTS

CN 108798482 A * 11/2018 ............ E06C 7/423
KR 20200001223 U * 6/2020 ............... E06C 7/42
KR 20210101434 A * 8/2021 ............... E06C 7/50

*Primary Examiner* — Taylor Morris
(74) *Attorney, Agent, or Firm* — Daniel M. Cohn

(57) ABSTRACT

The present invention relates to the technical field of ladders, and in particular to a connecting rod stabilizing structure for a herringbone ladder. The connecting rod stabilizing structure for a herringbone ladder includes a transverse tube and two connecting rod structures. The connecting rod structure includes a first connecting rod and a second connecting rod. One end of the first connecting rod is fixedly sleeved with a connecting sleeve. A latch stick is slidably connected in the connecting sleeve. The second connecting rod is provided with an insertion hole. The transverse tube is connected between the two connecting sleeves and is in communication with both connecting sleeves. Even when there is no user standing on the herringbone ladder, the connecting rod structures can play a role in improving the stability of the herringbone ladder.

8 Claims, 13 Drawing Sheets

(56) References Cited

U.S. PATENT DOCUMENTS

| | | | | |
|---|---|---|---|---|
| 11,391,089 | B2 * | 7/2022 | Wernberg | E06C 7/42 |
| 2007/0181369 | A1 * | 8/2007 | Gibson | E06C 7/18<br>182/165 |
| 2016/0138336 | A1 * | 5/2016 | Lin | E06C 1/18<br>182/104 |

* cited by examiner

CONNECTING ROD STABILIZING STRUCTURE FOR HERRINGBONE LADDER

TECHNICAL FIELD

The present invention relates to the technical field of ladders, and in particular to a connecting rod stabilizing structure for a herringbone ladder.

BACKGROUND ART

A herringbone ladder is a device that supports construction workers to perform work at height. The herringbone ladder in the prior art is generally composed of two ladder bodies hinged at the top. When not in use, the two ladder bodies can be rotated and folded to facilitate the storage of the herringbone ladder. When in use, the two ladder bodies are rotated and unfolded to form a certain angle between the two ladder bodies, and bottom ends of the two ladder bodies are both in contact with the ground. When in use, it does not require the support of a special person and can be supported by itself without the help of other objects.

However, since the angle between the two ladder bodies is not restricted, ladder rods will slide when a certain vibration occurs, the angle between the two ladder bodies will increase, and the telescopic ladder body will shake to a certain extent, which is quite dangerous.

Therefore, in the prior art, two stabilizing structures symmetrically arranged left and right are usually connected between the two ladder bodies. The stabilizing structures are generally composed of two connecting rods, and ends of the two connecting rods away from each other are respectively hinged to the two ladder bodies, and ends of the two connecting rods facing each other are hinged to each other. Examples are household safety folding ladders with model A11, household ladders with model A0113-104, glass fiber reinforced plastic insulated ladders with model 33-4, among others.

The stabilizing structures will be folded and unfolded synchronously with the herringbone ladder. On one hand, the stabilizing structures are used to limit the unfolding angle of the herringbone ladder, so as to prevent the herringbone ladder from being unstable when a user stands on it due to the overlarge unfolding angle of the herringbone ladder; on the other hand, they are used to improve the stability of the herringbone ladder when a user stand on it. However, when the herringbone ladder is unfolded and the user is not standing on it, the stability of the ladder itself is not strong because the two connecting rods are not fixed. Once a near-bottom part of the herringbone ladder is accidentally touched, the herringbone ladder is at risk of tipping over. For example, after the user unfolds the herringbone ladder and is about to climb up, he accidentally falls and falls on the near-bottom part of the herringbone ladder. At this time, the herringbone ladder will be rotated and folded to a certain angle, and the herringbone ladder cannot be placed stably on the ground, causing the herringbone ladder to tip over and even fall on the user.

In summary, the stabilizing structures in the prior art can stabilize the herringbone ladder only when the user is standing on the herringbone ladder under the action of the gravity of the user. When the user is not standing on the herringbone ladder, the stabilizing structures only serve to limit the unfolding angle of the herringbone ladder, but do not serve to enhance the stability of the herringbone ladder.

Therefore, the present invention proposes a technical solution to solve the above-mentioned problem that when the herringbone ladder is unfolded and the user is not standing on the herringbone ladder, the herringbone ladder itself is not very stable.

SUMMARY OF THE INVENTION

In view of the deficiencies in the prior art, the objective of the present invention is to provide a connecting rod stabilizing structure for a herringbone ladder, aimed to achieve the following technical effects: once the herringbone ladder is fully unfolded, first connecting rods and second connecting rods can be automatically fixed, thereby locking connecting rod structures. Even when there is no user standing on the herringbone ladder, the connecting rod structures can play a role in improving the stability of the herringbone ladder. Also, the two connecting rod structures can be unlocked at the same time with one button. The unlocking process of the connecting rod structures is quick and convenient, and does not affect the efficiency of folding the herringbone ladder.

A connecting rod stabilizing structure for a herringbone ladder, comprises a transverse tube and two connecting rod structures, wherein the two connecting rod structures are both hinged between two ladder bodies of the herringbone ladder and are symmetrically arranged front and back, the connecting rod structure comprises a first connecting rod and a second connecting rod, ends of the first connecting rod and the second connecting rod which are away from each other are respectively hinged to the two ladder bodies of the herringbone ladder, the other end of the first connecting rod is fixedly sleeved with a connecting sleeve, a latch stick is slidably connected in the connecting sleeve, one end of the latch stick passes through the first connecting rod and passes through and out of the connecting sleeve in a sliding connection manner and its cross section is provided to be arc-shaped, the other end of the second connecting rod is rotatably connected to the connecting sleeve and the first connecting rod through a pin, the second connecting rod is provided with an insertion hole for inserting the end of the latch stick that passes through and out of the connecting sleeve, the transverse tube is connected between the two connecting sleeves and is in communication with both connecting sleeves, and a driving structure is provided in the transverse tube and the two connecting sleeves for driving the two latch sticks to retract into the connecting sleeves at the same time and generating rebound forces on the latch sticks.

By using the above-mentioned technical solution, as the two ladder bodies of the herringbone ladder rotate relative to each other, the first connecting rods and the second connecting rods in the connecting rod structures also rotate relative to each other. When the herringbone ladder is unfolded, the connecting rod structures are also unfolded, and the angles between the first connecting rods and the second connecting rods gradually increase until the angles between the first connecting rods and the second connecting rods are 180°. During the rotation and unfolding of the connecting rod structure, the second connecting rod will press against the end of the latch stick that passes through and out of the connecting sleeve. Since its cross section is provided to be arc-shaped, under the pressing of the second connecting rod, the latch stick will retract into the connecting sleeve, the latch stick drives the driving structure to operate, and the driving structure generates a rebound force on the latch stick. When the angle between the first connecting rod and the second connecting rod is 180°, the latch stick is aligned with the insertion hole. Under the action of the rebound force, the latch stick moves to restore to its original position, and one end of the latch stick that passes through and out of the connecting sleeve is inserted into the insertion hole, thereby completing the fixation between the first connecting rod and the second connecting rod. That is, the connecting rod structure is automatically locked after the herringbone ladder is unfolded. Similarly, when the herringbone ladder needs to be folded, the two latch sticks are driven by the driving structure to retract into the connecting sleeves at the same time, such that the connecting rod structures can be unlocked. When the herringbone ladder is folded, the connecting rod structures are automatically folded. After the connecting rod stabilizing structure of the present invention is mounted on the herringbone ladder, once the herringbone ladder is fully unfolded, the first connecting rods and the second connecting rods can be automatically fixed, thereby locking the connecting rod structures. Even when there is no user standing on the herringbone ladder, the connecting rod structures can play a role in improving the stability of the herringbone ladder. Also, the two connecting rod structures can be unlocked at the same time with one button. The unlocking process of the connecting rod structures is quick and convenient, and does not affect the efficiency of folding the herringbone ladder.

The present invention is further configured as follows: a positioning plate for positioning the second connecting rod is integrally formed on an outer side wall of the connecting sleeve.

By using the above-mentioned technical solution, when the second connecting rod comes into contact with the positioning plate, the first connecting rod and the second connecting rod cannot continue to rotate and unfold. In this case, the included angle between the first connecting rod and the second connecting rod is exactly 180°, and the latch stick is also exactly aligned with the insertion hole. The provision of the positioning plate can ensure that the latch stick is accurately aligned with the insertion hole.

The present invention is further configured as follows: the driving structure comprises a first button, a pushing pole and two first driving assemblies, the two first driving assemblies are respectively located in the two connecting sleeves and are symmetrically arranged front and back, the first driving assembly comprises a pushing block, a fixed sleeve and a moving block, the fixed sleeve is fixed in the connecting sleeve, one end of the latch stick passes into the fixed sleeve in a sliding connection manner and a first spring is fixedly connected between said end of latch stick and an inner bottom wall of the fixed sleeve, the moving block is located in the connecting sleeve and is fixedly sleeved outside the latch stick, the moving block is provided with a first inclined surface, the pushing block is located in the connecting sleeve, the pushing block is provided with a first sliding groove extending transversely to the left and right, and is provided with a second inclined surface matched with the first inclined surface, the pushing block moves left and right along an inner side wall of the connecting sleeve, and is slidably sleeved outside the latch stick through the first sliding groove, the pushing pole moves left and right along an inner side wall of the transverse tube, and front and rear ends of the pushing pole are respectively inserted into the two connecting sleeves and are fixedly connected to the two pushing blocks respectively, one end of the first button is fixedly connected to the pushing pole, and the other end of the first button passes through and out of the transverse tube in a sliding connection manner.

By using the above-mentioned technical solution, when there is a need to drive the two latch sticks to retract into the connecting sleeves at the same time through the driving structure, the first button is pressed. The first button drives the pushing pole to move along the inner side wall of the transverse tube. The pushing pole drives the two pushing blocks to move simultaneously. The pushing block moves along the inner side wall of the connecting sleeve and moves along the latch stick through the first sliding groove. The second inclined surface is pressed against the first inclined surface. The force exerted on the first inclined surface can be decomposed into a force causing it to move toward the fixed sleeve. Under the action of this force, the moving block drives the latch stick to move into the fixed sleeve. Thus, the latch stick is drawn out from the insertion hole and retracts into the connecting sleeve. In this case, the first spring is compressed to generate a rebound force.

The present invention is further configured as follows: first auxiliary springs are fixedly connected between both ends of the pushing pole and the inner side walls of the two connecting sleeves.

By using the above-mentioned technical solution, when the pushing pole moves along the inner side wall of the transverse tube, the first auxiliary springs are compressed to form rebound forces. The first auxiliary springs cooperate with the first springs to ensure that the driving structure and the latch sticks can be restored to their original positions after the first button is released.

The present invention is further configured as follows: the driving structure comprises a second button, a fixed tubing, a mounting block and two second driving assemblies, the fixed tubing is fixedly sleeved at a middle position outside the transverse tube, an outer side wall of the fixed tubing is provided with a first opening which is in communication with the interior of the fixed tubing, the transverse tube is provided with a second opening which is in communication with the interior of the transverse tube and is aligned with the first opening, the mounting block is fixed inside the transverse tube, two mounting grooves symmetrically arranged front and back are formed on one side of the mounting block close to the second opening, groove walls of the two mounting grooves which are on opposite sides are both provided with second sliding groove, one end of the second button is located outside the fixed tubing, the other end of the second button passes into the fixed tubing through the first opening in a sliding connection manner, the two second driving assemblies correspond to the two mounting grooves respectively and are symmetrically arranged front and back, the second driving assembly includes a pressing bar, a rotating block and a sliding rod, one end of the pressing bar is fixedly connected to the second button, the other end of the pressing bar is hinged to the rotating block, the other end of the rotating block is rotatably connected between upper and lower groove walls of the mounting groove through a rotating shaft, and is integrally formed with two rotating plates that are spaced apart, ends of the two rotating plates away from the rotating block are both integrally formed with circular plates, one end of the sliding rod passes into the second sliding groove in a sliding connection manner, and a second spring is fixedly connected between said end of the sliding rod and a bottom of the second sliding groove, the other end of the sliding rod passes through and out of the second sliding groove and is fixed with a transition rod, the other end of the transition rod is fixed with a moving rod, the sliding rod, the transition rod and the moving rod are all arranged concentrically and coaxially, and the cross-sectional areas of the sliding rod and the moving rod are both larger than the cross-sectional area of the transition rod, the transition rod passes through a space between the two circular plates in a fitting manner, opposite sides of the sliding rod and the moving rod are both in contact with outer side walls of the circular plates, the two moving rods are aligned with the two latch sticks respectively, and one end of the moving rod that is away from the transition rod passes through and out of the mounting block in a sliding connection manner, and passes into the connecting sleeve and is fixedly connected to the latch stick.

By using the above-mentioned technical solution, when there is a need to drive the two latch sticks to retract into the connecting sleeves at the same time through the driving structure, the second button is pressed. The second button drives the pressing bar to move. The pressing bar drives the rotating block to rotate. The rotating block drives the rotating plates to rotate. The rotating plates drive the circular plates to rotate. The circular plates press against the sliding rod. The sliding rod passes into the second sliding groove, and the second spring is compressed to generate a rebound force. The sliding rod drives the moving rod to retract into the transverse tube by means of the transition rod. The moving rod drives the latch stick to be drawn out from the insertion hole and retract into the connecting sleeve.

The present invention is further configured as follows: a second auxiliary spring located between two mounting grooves is fixed on one side of the mounting block close to the second opening, and the other end of the second auxiliary spring is fixedly connected to the second button.

By using the above-mentioned technical solution, when the second button is being pressed, the second auxiliary spring is compressed to generate a rebound force.

The second auxiliary spring cooperates with the second springs to ensure that the driving structure and the latch sticks can be restored to their original positions after the second button is released.

The present invention is further configured as follows: the driving structure is composed of two third driving assemblies that are symmetrically arranged front and back, the third driving assembly comprises a mounting sleeve, a sliding block, a third sliding groove and a pulling pole, the mounting sleeve is fixed in the transverse tube, one end of the pulling pole passes into the mounting sleeve in a sliding connection manner, and a third spring is fixedly connected between said end of the pulling pole and an inner bottom wall of the mounting sleeve, the other end of the pulling pole passes through and out of the mounting sleeve and is fixedly connected to the latch stick, the third sliding groove is formed on an outer side wall of the transverse tube, the third sliding groove extends transversely forward and backward and is in communication with the interior of the transverse tube, the sliding block slides forward and backward along the third sliding groove, a bottom end of the sliding block is fixedly connected to the pulling pole, and a top end of the sliding block passes through and out of the transverse tube through the third sliding groove.

By using the above-mentioned technical solution, when there is a need to drive the two latch sticks to retract into the connecting sleeves at the same time through the driving structure, the two sliding blocks are made to move toward each other. The sliding block slides along the third sliding groove. The sliding block drives the pulling pole to move into the mounting sleeve. The pulling pole drives the latch stick to retract into the connecting sleeve. In this case, the third spring is compressed to generate a rebound force.

The present invention is further configured as follows: a sliding plate for covering the third sliding groove is integrally formed at the top end of the sliding block, and a vertical plate is integrally formed at the top end of the sliding block.

By using the above-mentioned technical solution, the vertical plate is provided to facilitate the movement of the sliding plate, and the sliding plate is provided to cover the third sliding groove, so as to prevent impurities such as dust and rainwater from entering the transverse tube.

Compared with the prior art, the beneficial effects of the present invention are as follows.

After a connecting rod stabilizing structure for a herringbone ladder of the present invention is mounted on the herringbone ladder, once the herringbone ladder is fully unfolded, the first connecting rods and the second connecting rods can be automatically fixed, thereby locking the connecting rod structures. Even when there is no user standing on the herringbone ladder, the connecting rod structures can play a role in improving the stability of the herringbone ladder. Also, the two connecting rod structures can be unlocked at the same time with one button. The unlocking process of the connecting rod structures is quick and convenient, and does not affect the efficiency of folding the herringbone ladder.

Reference signs: 1. herringbone ladder; 2. transverse tube; 3. mounting plate; 4. first connecting rod; 5. second connecting rod; 6. connecting sleeve; 7. latch stick; 8. insertion hole; 9. first button; 10. pushing pole; 11. pushing block; 12. fixed tubing; 13. moving block; 14. first spring; 15. first inclined surface; 16. first sliding groove; 17. second inclined surface; 18. first auxiliary spring; 19. positioning plate; 20. second button; 21. fixed tubing; 22. mounting block; 23. first opening; 24. second opening; 25. mounting groove; 26. second sliding groove; 27. pressing bar; 28. rotating block; 29. sliding rod; 30. rotating plate; 31. circular plate; 32. second spring; 33. transition rod; 34. moving rod; 35. second auxiliary spring; 36. mounting sleeve; 37. sliding block; 38. third sliding groove; 39. pulling pole; 40. third spring; 41. sliding plate; 42. vertical plate.

DETAILED DESCRIPTION OF EMBODIMENTS

The technical solutions in the embodiments of the present invention will be described clearly and completely below in conjunction with the accompanying drawings for the embodiments of the present invention; and obviously, the embodiments described are merely some, rather than all, of the embodiments of the present invention. All other embodiments obtained by those of ordinary skills in the art based on the embodiments of the present invention without any creative efforts shall all fall within the protection scope of the present invention.

Embodiment 1

Figure 1:
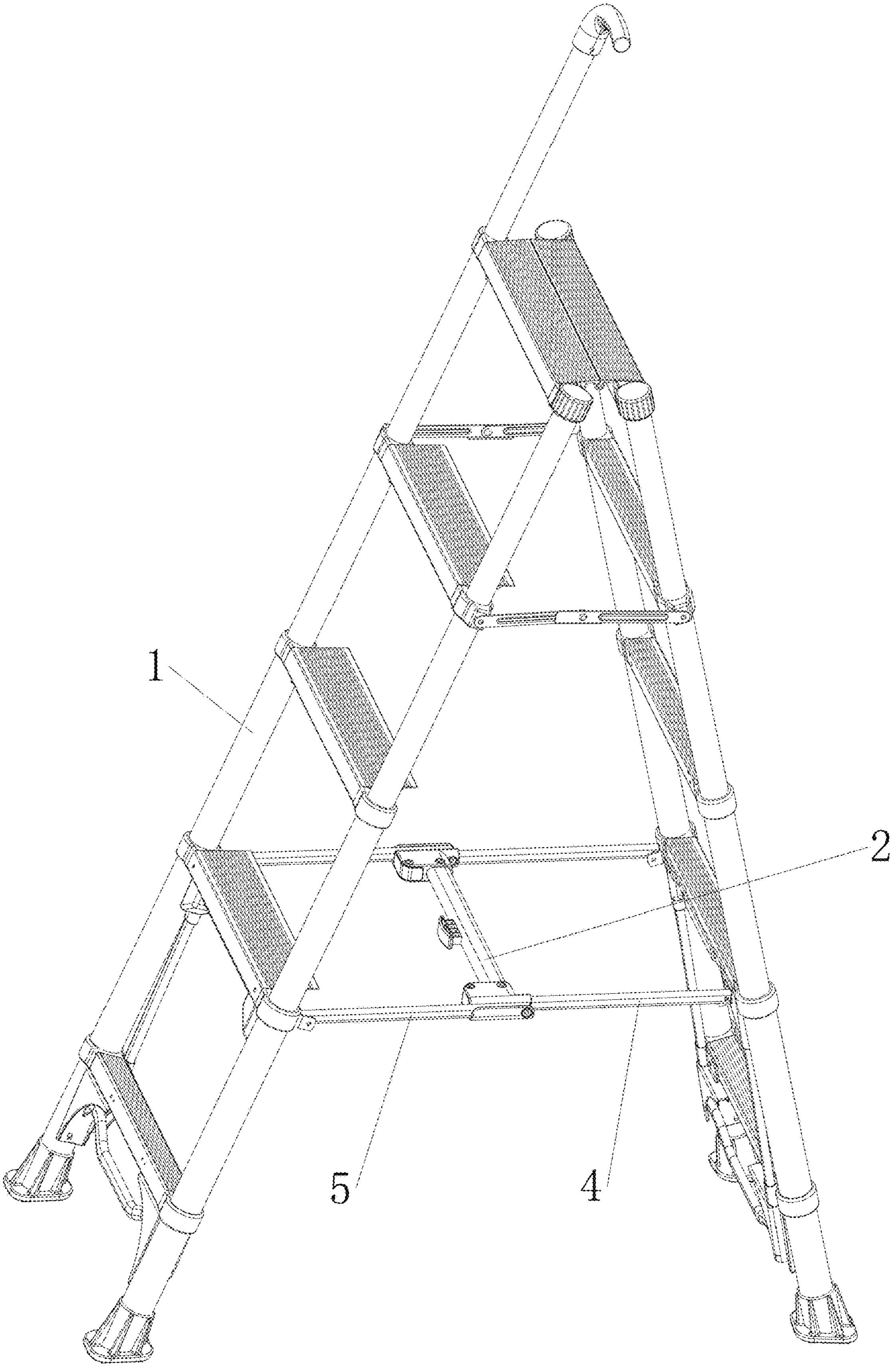
FIG. 1 is a schematic diagram of a connecting rod stabilizing structure of Embodiment 1 when it is installed on a herringbone ladder.
Figure 2:
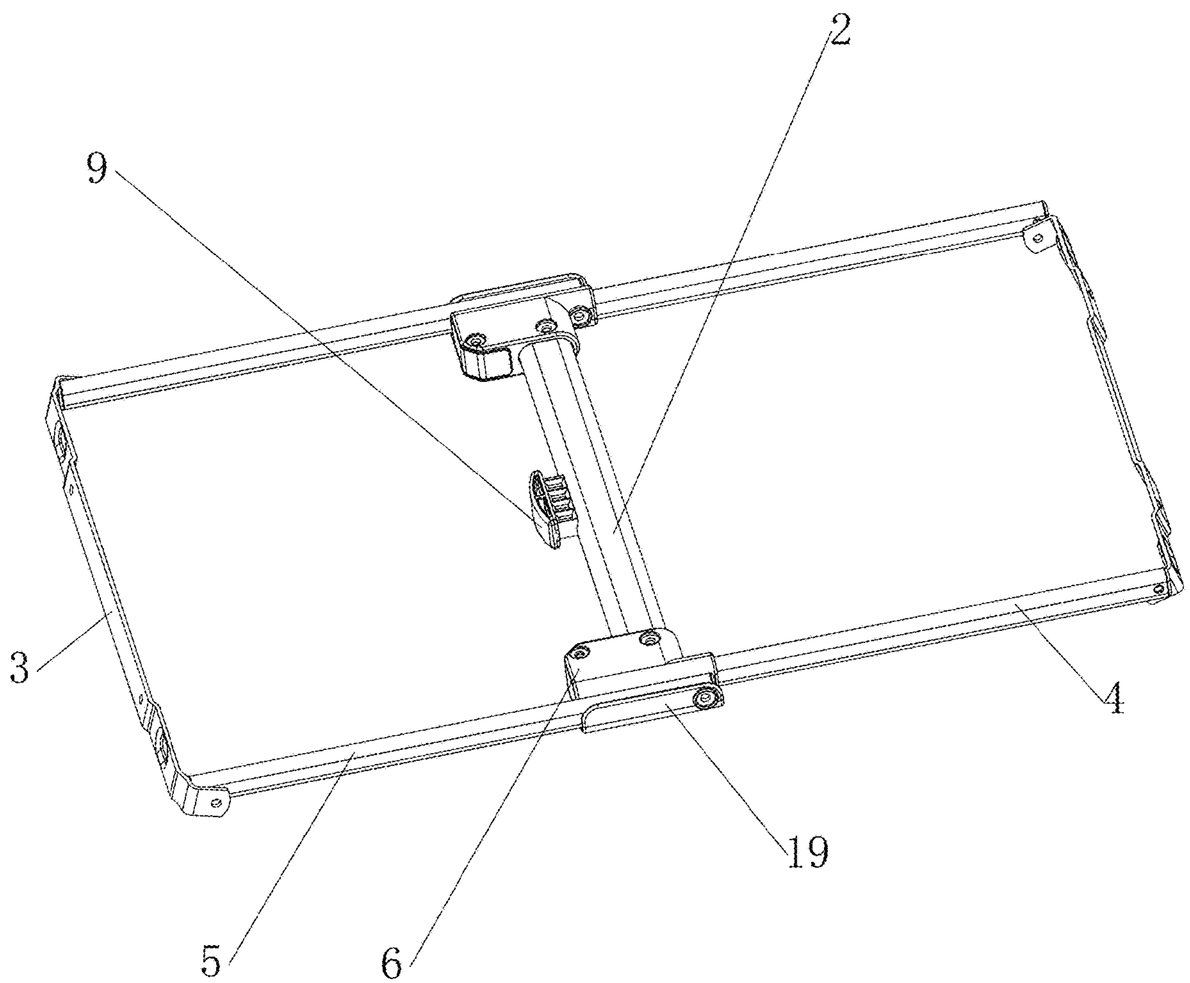
FIG. 2 is a schematic diagram of the connecting rod stabilizing structure of Embodiment 1.
Figure 3:
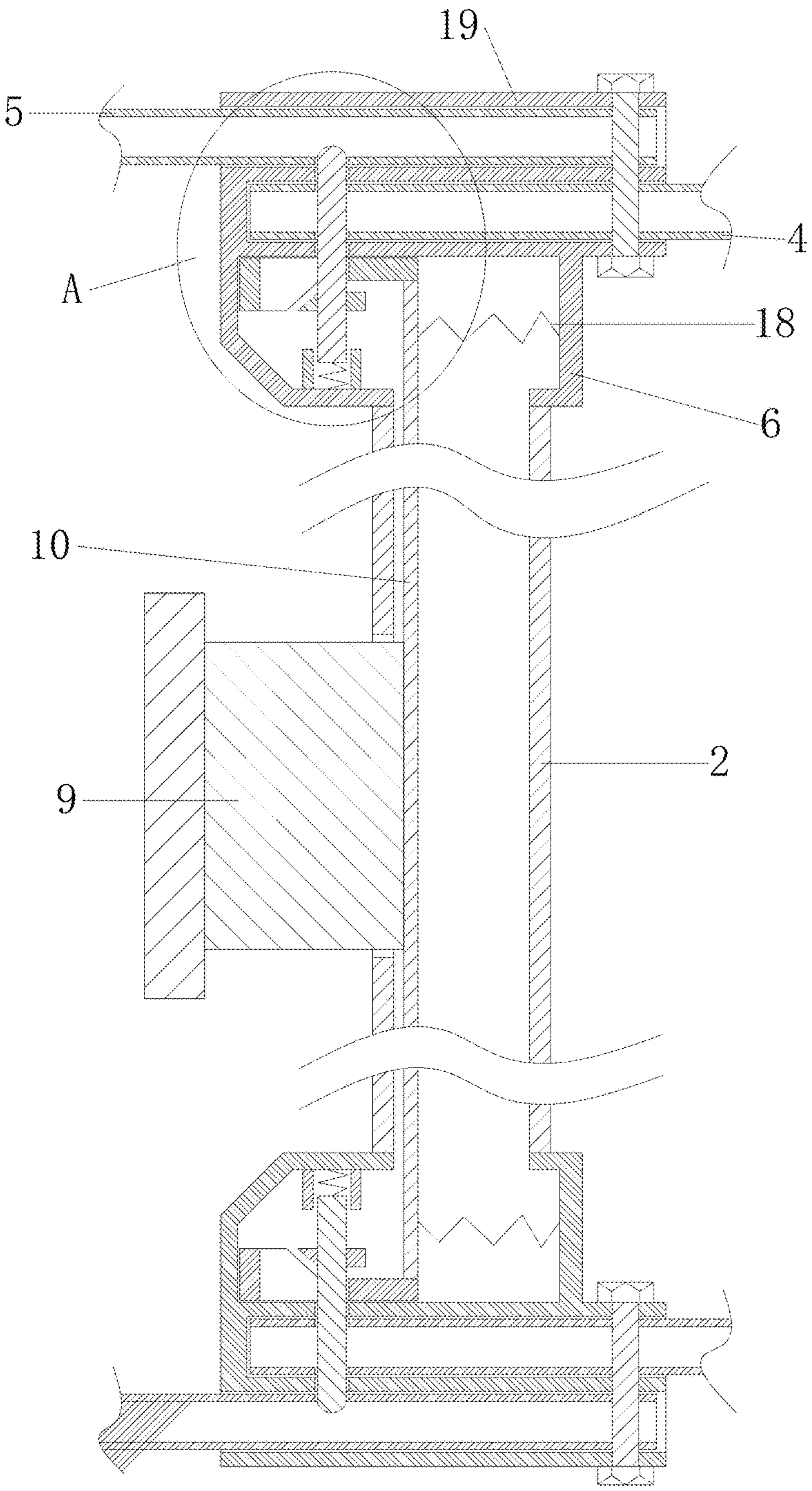
FIG. 3 is a partial cross-sectional view of the connecting rod stabilizing structure of Embodiment 1 in a top view.
Figure 4:
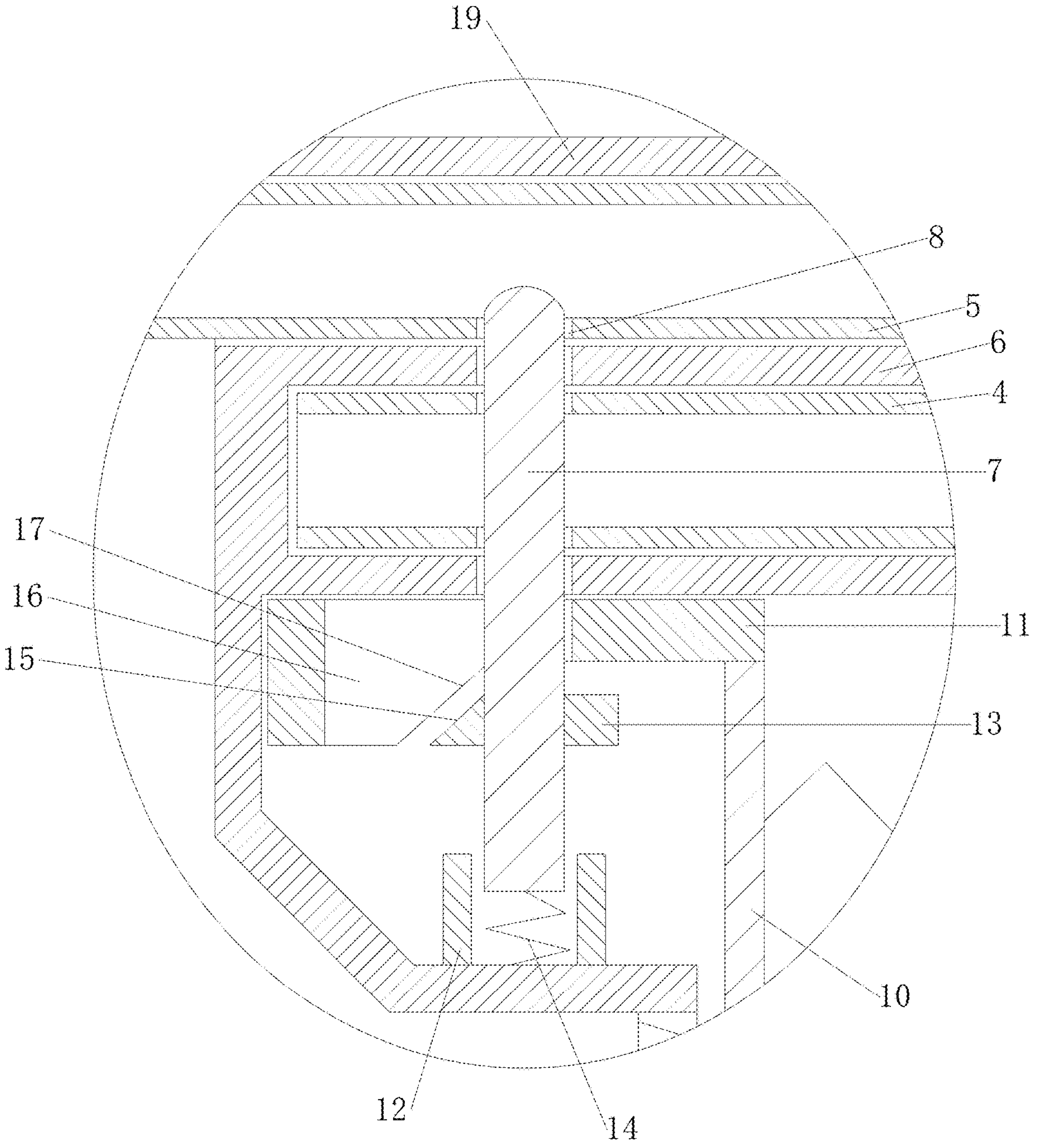
FIG. 4 is an enlarged view of part A in FIG. 3.
Figure 5:
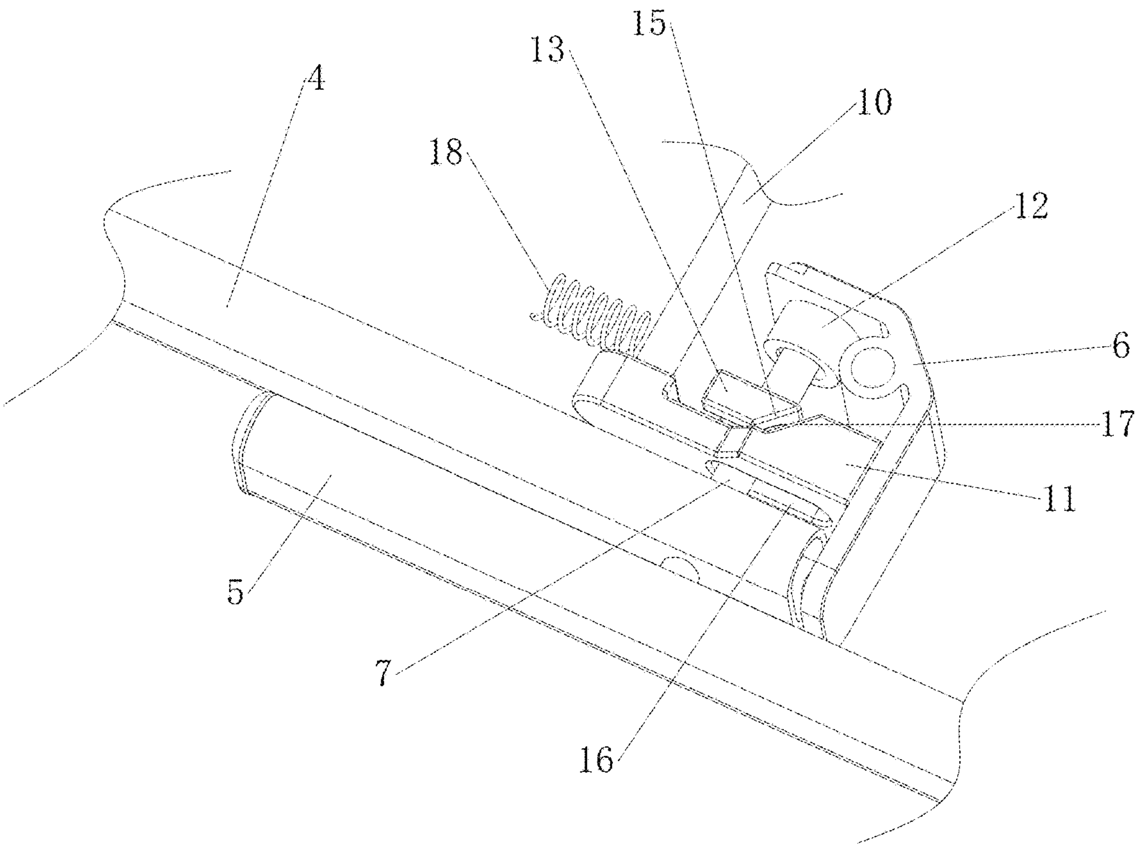
FIG. 5 is a schematic diagram of a partial structure of a first connecting rod, a second connecting rod, a latch stick, a pushing pole and a first driving assembly in Embodiment 1.

A connecting rod stabilizing structure for a herringbone ladder, as shown in FIGS. 1 to 5, includes a transverse tube 2 and two connecting rod structures. The two connecting rod structures are both hinged between two ladder bodies of the herringbone ladder and are symmetrically arranged front and back. The connecting rod structure includes a first connecting rod 4 and a second connecting rod 5. Ends of the first connecting rod 4 and the second connecting rod 5 which are away from each other are respectively hinged to the two ladder bodies of the herringbone ladder. The other end of the first connecting rod 4 is fixedly sleeved with a connecting sleeve 6. A latch stick 7 is slidably connected in the connecting sleeve 6. One end of the latch stick 7 passes through the first connecting rod 4 and passes through and out of the connecting sleeve 6 in a sliding connection manner, and its cross section is provided to be arc-shaped. The other end of the second connecting rod 5 is rotatably connected to the connecting sleeve 6 and the first connecting rod 4 through a pin. The second connecting rod 5 is provided with an insertion hole 8 for inserting the end of the latch stick 7 that passes through and out of the connecting sleeve 6. The transverse tube 2 is connected between the two connecting sleeves 6 and is in communication with both connecting sleeves 6. A driving structure is provided in the transverse tube 2 and the two connecting sleeves 6 for driving the two latch sticks 7 to retract into the connecting sleeves 6 at the same time and generating rebound forces on the latch sticks 7.

The driving structure includes a first button 9, a pushing pole 10 and two first driving assemblies. The two first driving assemblies are respectively located in the two connecting sleeves 6 and are symmetrically arranged front and back. The first driving assembly includes a pushing block 11, a fixed sleeve 12 and a moving block 13. The fixed sleeve 12 is fixed in the connecting sleeve 6. One end of the latch stick 7 passes into the fixed sleeve 12 in a sliding connection manner, and a first spring 14 is fixedly connected between said end of the latch stick and an inner bottom wall of the fixed sleeve 12. The moving block 13 is located in the connecting sleeve 6, and is fixedly sleeved outside the latch stick 7. The moving block 13 is provided with a first inclined surface 15. The pushing block 11 is located in the connecting sleeve 6. The pushing block 11 is provided with a first sliding groove 16 extending transversely to the left and right, and is provided with a second inclined surface 17 matched with the first inclined surface 15. The pushing block 11 moves left and right along an inner side wall of the connecting sleeve 6, and is slidably sleeved outside the latch stick 7 through the first sliding groove 16. The pushing pole 10 moves left and right along an inner side wall of the transverse tube 2, and front and rear ends of the pushing pole 10 are respectively inserted into the two connecting sleeves 6 and are fixedly connected to the two pushing blocks 11 respectively. One end of the first button 9 is fixedly connected to the pushing pole 10, and the other end of the first button 9 passes through and out of the transverse tube 2 in a sliding connection manner. First auxiliary springs 18 are fixedly connected between both ends of the pushing pole 10 and the inner side walls of the two connecting sleeves 6.

Additionally, a positioning plate 19 for positioning the second connecting rod 5 is integrally formed on an outer side wall of the connecting sleeve 6. When the second connecting rod 5 comes into contact with the positioning plate 19, the first connecting rod 4 and the second connecting rod 5 cannot continue to rotate and unfold. In this case, the included angle between the first connecting rod 4 and the second connecting rod 5 is exactly 180°, and the latch stick 7 is also exactly aligned with the insertion hole 8. The provision of the positioning plate 19 can ensure that the latch stick 7 is accurately aligned with the insertion hole 8.

It is worth noting that in this embodiment, the way of hinging the first connecting rod 4 and the second connecting rod 5 to the ladder bodies of the herringbone ladder can be that: the first connecting rod 4 and the second connecting rod 5 are directly hinged to pedals or ladder tubes of the herringbone ladder or to plastic pieces between two adjacent ladder tubes; or two mounting plates 3 can be provided, where the two mounting plates 3 are respectively hinged between left and right ends of the two connecting rod structures, and then the mounting plates 3 are fixed to the pedals of the herringbone ladder by bolts.

Working Principle

As the two ladder bodies of the herringbone ladder 1 rotate relative to each other, the first connecting rods 4 and the second connecting rods 5 in the connecting rod structures also rotate relative to each other.

When the herringbone ladder 1 needs to be folded, the first button 9 is pressed at first. The first button 9 drives the pushing pole 10 to move along the inner side wall of the transverse tube 2. The first auxiliary spring 18 is compressed to generate a rebound force. The pushing pole 10 drives the two pushing blocks 11 to move simultaneously. The pushing block 11 moves along the inner side wall of the connecting sleeve 6, and moves along the latch stick 7 through the first sliding groove 16. The second inclined surface 17 is pressed against the first inclined surface 15. The force exerted on the first inclined surface 15 can be decomposed into a force causing it to move toward the fixed sleeve 12. Under the action of this force, the moving block 13 drives the latch stick 7 to move into the fixed sleeve 12. Thus, the latch stick 7 is drawn out from the insertion hole 8 and retracts into the connecting sleeve 6. In this case, the first spring 14 is compressed to generate a rebound force. In this way, the connecting rod structures can be unlocked, and when the herringbone ladder 1 is folded, the connecting rod structures are automatically folded. After the first button 9 is released, the cooperation of the first auxiliary spring 18 and the first spring 14 ensures that the driving structure and the latch sticks 7 can be restored to their original positions.

Similarly, when the herringbone ladder 1 is unfolded, the connecting rod structures are also unfolded, and the angles between the first connecting rods 4 and the second connecting rods 5 gradually increase until the angles between the first connecting rods 4 and the second connecting rods 5 are 180°. During the rotation and unfolding of the connecting rod structure, the second connecting rod 5 will press against the end of the latch stick 7 that passes through and out of the connecting sleeve 6. Since its cross section is provided to be arc-shaped, under the pressing of the second connecting rod 5, the latch stick 7 will retract into the connecting sleeve 6, and the first spring 14 generates a rebound force. When the angle between the first connecting rod 4 and the second connecting rod 5 is 180°, the latch stick 7 is aligned with the insertion hole 8. Under the action of the rebound force of the first spring 14, the latch stick 7 moves to restore to its original position, and one end of the latch stick 7 that passes through and out of the connecting sleeve 6 is inserted into the insertion hole 8, thereby completing the fixation between the first connecting rod 4 and the second connecting rod 5. That is, the connecting rod structure is automatically locked after the herringbone ladder 1 is unfolded.

After the connecting rod stabilizing structure of the present invention is mounted on the herringbone ladder 1, once the herringbone ladder 1 is fully unfolded, the first connecting rods 4 and the second connecting rods 5 can be automatically fixed, thereby locking the connecting rod structures. Even when there is no user standing on the herringbone ladder 1, the connecting rod structures can play a role in improving the stability of the herringbone ladder 1. Also, the two connecting rod structures can be unlocked at the same time with one button. The unlocking process of the connecting rod structures is quick and convenient, and does not affect the efficiency of folding the herringbone ladder 1.

Embodiment 2

Figure 6:
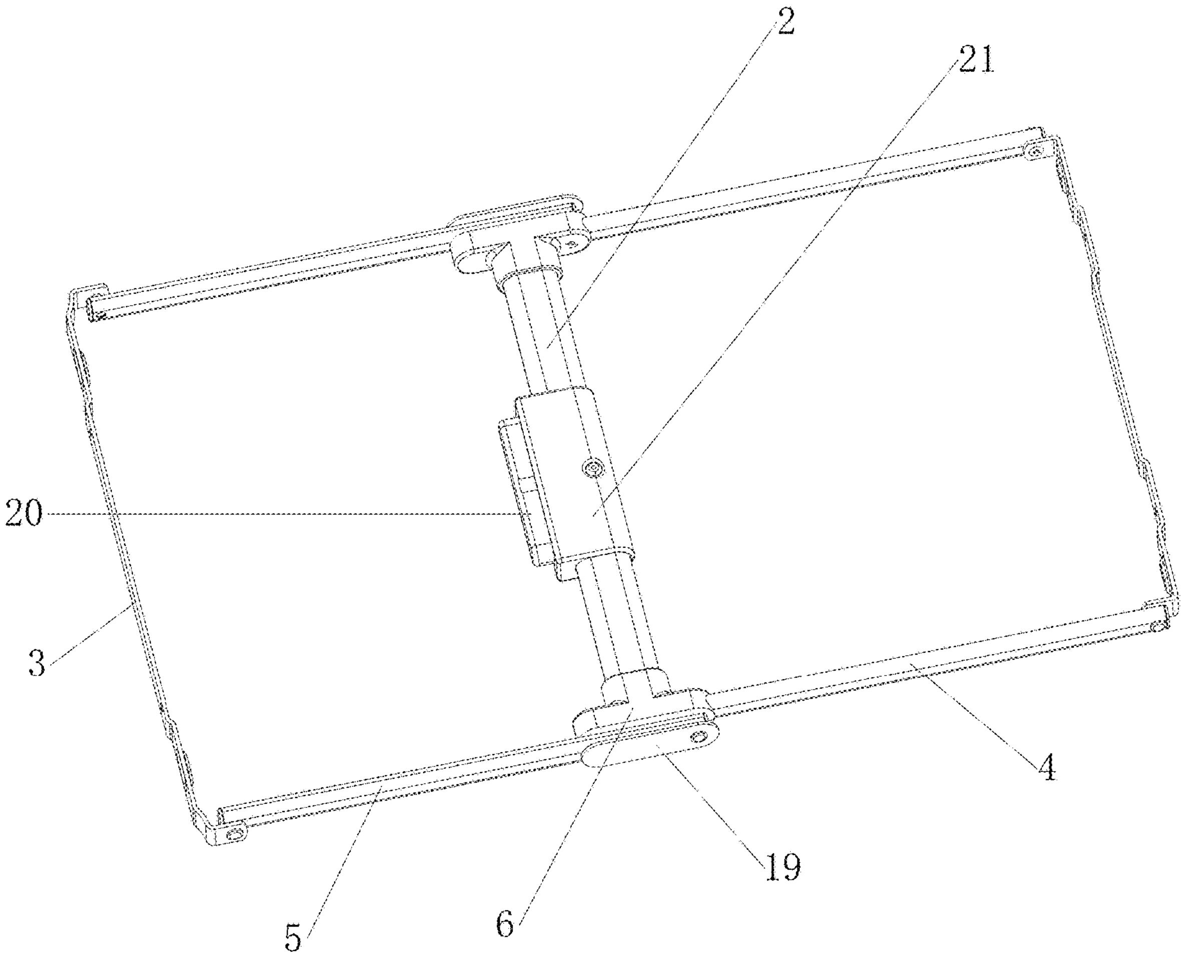
FIG. 6 is a schematic diagram of a connecting rod stabilizing structure of Embodiment 2.
Figure 7:
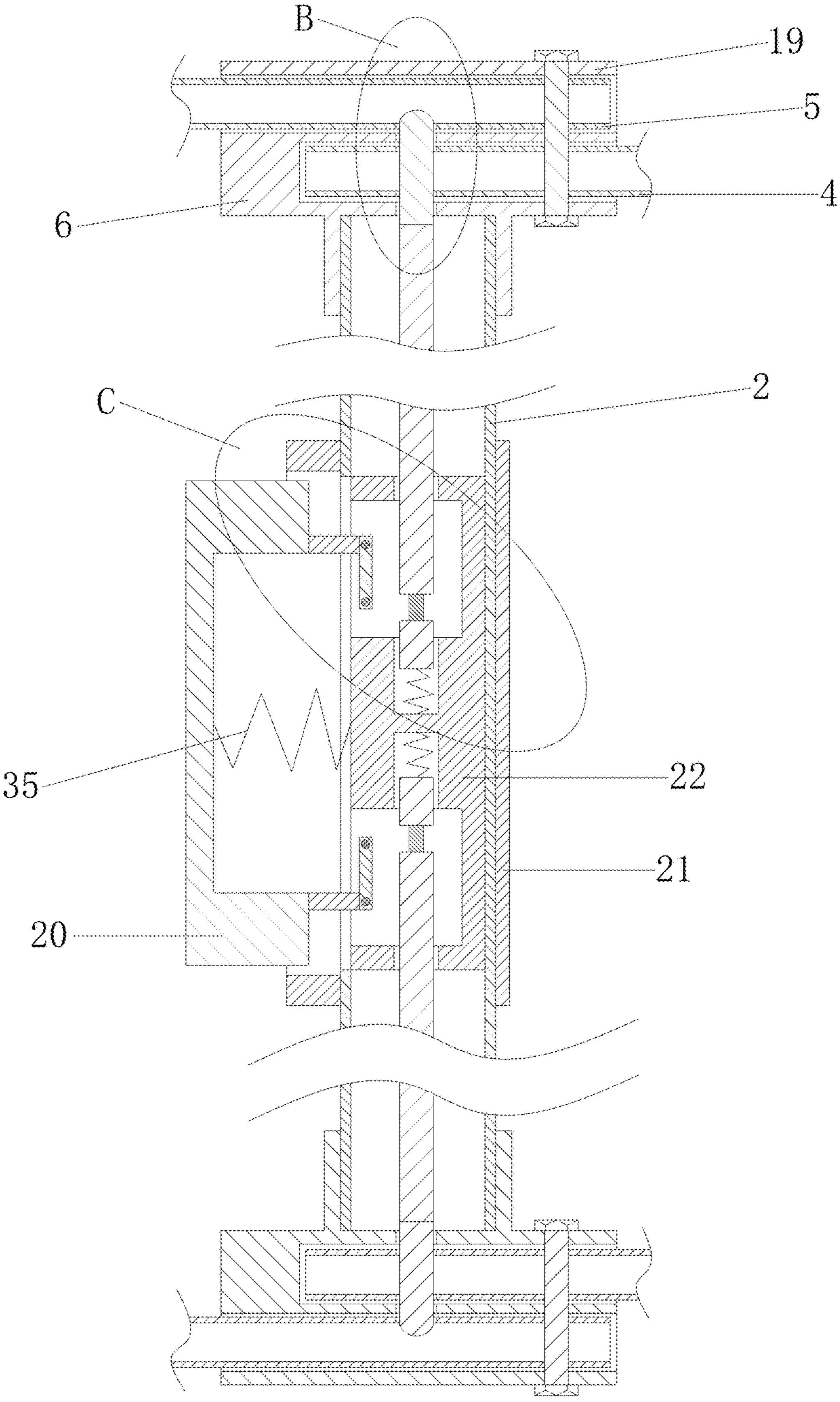
FIG. 7 is a partial cross-sectional view of the connecting rod stabilizing structure of Embodiment 2 in a top view.
Figure 8:
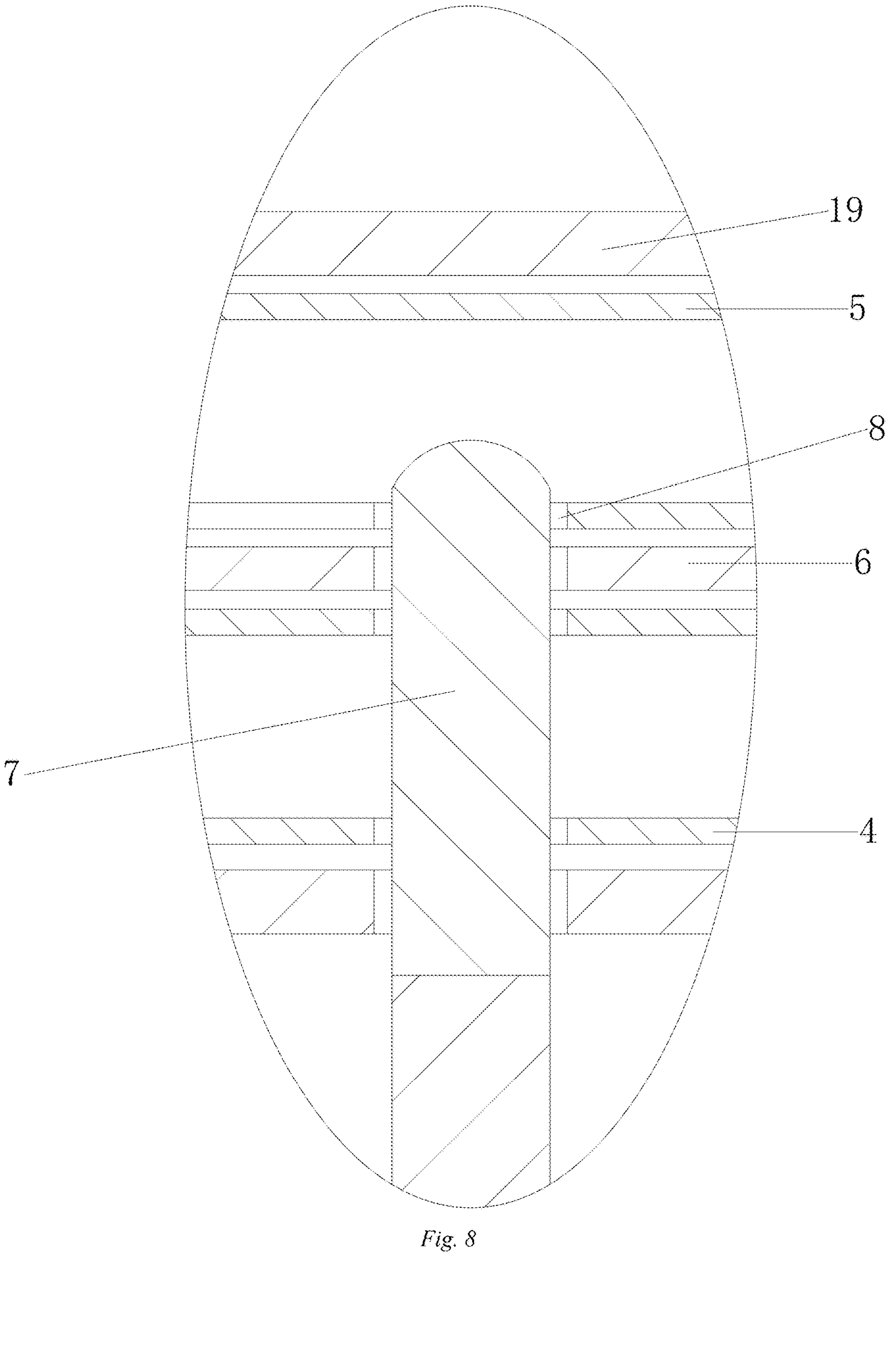
FIG. 8 is an enlarged view of part B in FIG. 7.
Figure 9:
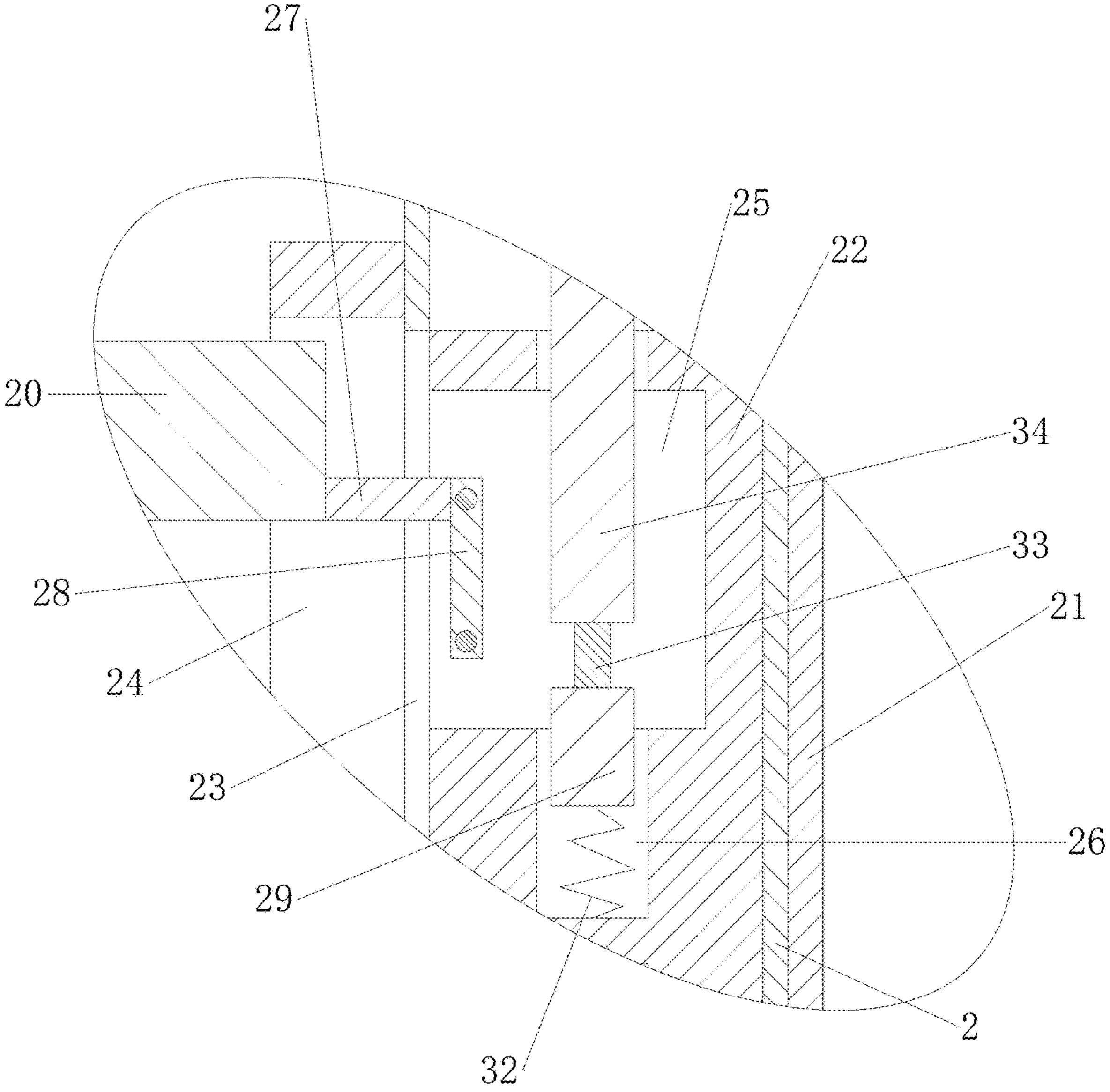
FIG. 9 is an enlarged view of part C in FIG. 7.
Figure 10:
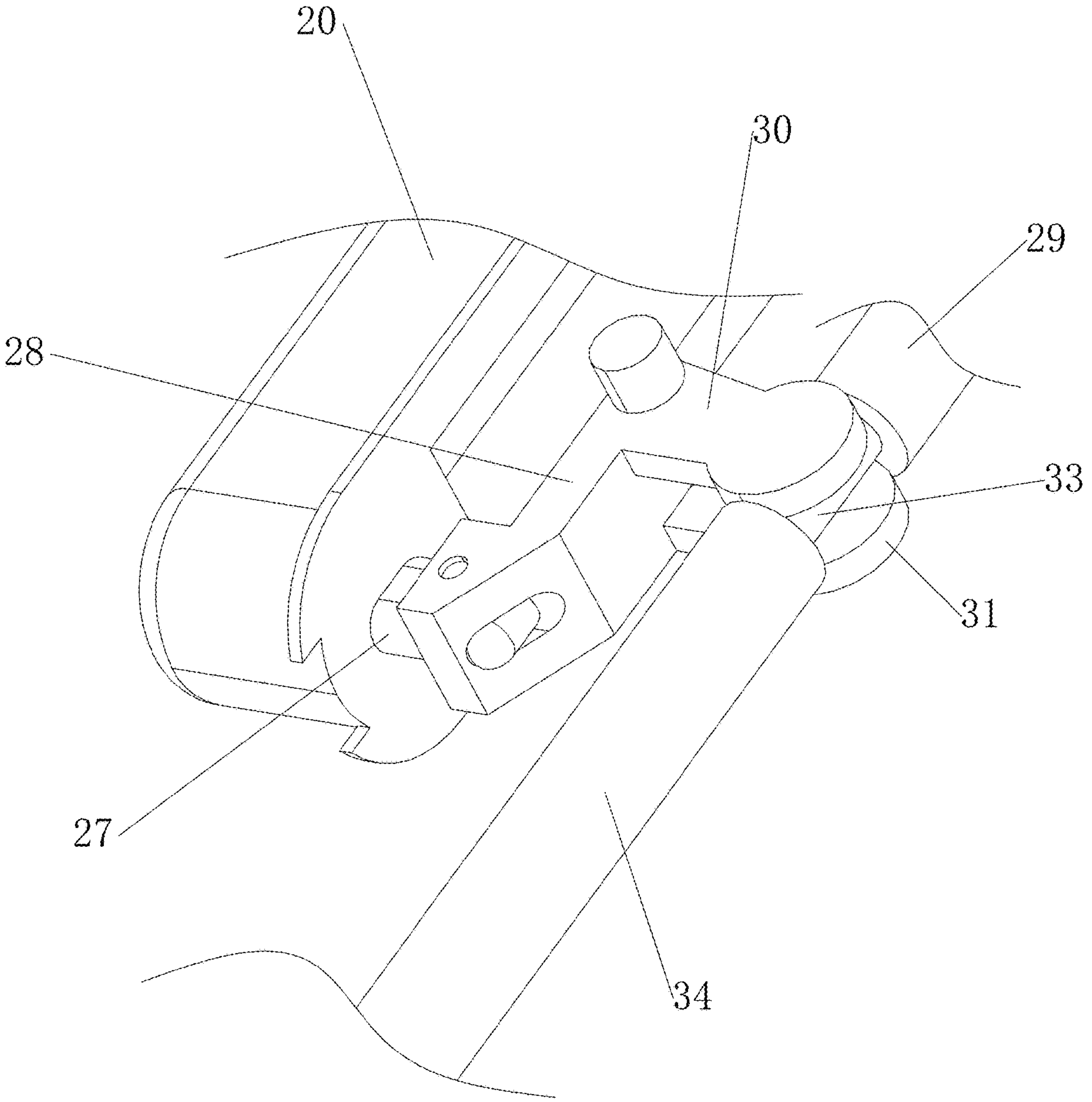
FIG. 10 is a schematic diagram of a partial structure of a second button and a second driving assembly in Embodiment 2.

The difference from Embodiment 1 is that the driving structure no longer includes the first button 9, the pushing pole 10 and the two first driving assemblies. Instead, as shown in FIGS. 6 to 10, it includes a second button 20, a fixed tubing 21, a mounting block 22 and two second driving assemblies. The fixed tubing 21 is fixedly sleeved at a middle position outside the transverse tube 2. An outer side wall of the fixed tubing 21 is provided with a first opening 23 which is in communication with the interior of the fixed tubing. The transverse tube 2 is provided with a second opening 24 which is in communication with the interior of the transverse tube and is aligned with the first opening 23. The mounting block 22 is fixed inside the transverse tube 2. Two mounting grooves 25 symmetrically arranged front and back are formed on one side of the mounting block 22 close to the second opening 24. Groove walls of the two mounting grooves 25 which are on opposite sides are both provided with second sliding groove 26. One end of the second button 20 is located outside the fixed tubing 21. The other end of the second button 20 passes into the fixed tubing 21 through the first opening 23 in a sliding connection manner. The two second driving assemblies correspond to the two mounting grooves 25 respectively and are symmetrically arranged front and back. The second driving assembly includes a pressing bar 27, a rotating block 28 and a sliding rod 29. One end of the pressing bar 27 is fixedly connected to the second button 20. The other end of the pressing bar 27 is hinged to the rotating block 28. The other end of the rotating block 28 is rotatably connected between upper and lower groove walls of the mounting groove 25 through a rotating shaft, and is integrally formed with two rotating plates 30 that are spaced apart. Ends of the two rotating plates 30 away from the rotating block 28 are both integrally formed with circular plates 31. One end of the sliding rod 29 passes into the second sliding groove 26 in a sliding connection manner, and a second spring 32 is fixedly connected between said end of the sliding rod and a bottom of the second sliding groove 26. The other end of the sliding rod 29 passes through and out of the second sliding groove 26 and is fixed with a transition rod 33. The other end of the transition rod 33 is fixed with a moving rod 34. The sliding rod 29, the transition rod 33 and the moving rod 34 are all arranged concentrically and coaxially, and the cross-sectional areas of the sliding rod 29 and the moving rod 34 are both larger than the cross-sectional area of the transition rod 33. The transition rod 33 passes through a space between the two circular plates 31 in a fitting manner. Opposite sides of the sliding rod 29 and the moving rod 34 are both in contact with outer side walls of the circular plates 31. The two moving rods 34 are aligned with the two latch sticks 7 respectively. One end of the moving rod 34 that is away from the transition rod 33 passes through and out of the mounting block 22 in a sliding connection manner, and passes into the connecting sleeve 6 and is fixedly connected to the latch stick 7. A second auxiliary spring 35 located between the two mounting grooves 25 is fixed on one side of the mounting block 22 close to the second opening 24. The other end of the second auxiliary spring 35 is fixedly connected to the second button 20.

When the herringbone ladder 1 needs to be folded, the second button 20 is pressed. The second auxiliary spring 35 is compressed to generate a rebound force. The second button 20 drives the pressing bar 27 to move. The pressing bar 27 drives the rotating block 28 to rotate. The rotating block 28 drives the rotating plates 30 to rotate. The rotating plates 30 drive the circular plates 31 to rotate. The circular plates 31 press against the sliding rod 29. The sliding rod 29 passes into the second sliding groove 26, and the second spring 32 is compressed to generate a rebound force. The sliding rod 29 drives the moving rod 34 to retract into the transverse tube 2 by means of the transition rod 33. The moving rod 34 drives the latch stick 7 to be drawn out from the insertion hole 8 and retract into the connecting sleeve 6. In this way, the connecting rod structures can be unlocked, and when the herringbone ladder 1 is folded, the connecting rod structures are automatically folded. After the second button 20 is released, the cooperation of the second auxiliary spring 35 and the second spring 32 ensures that the driving structure and the latch sticks 7 can be restored to their original positions.

Similarly, when the herringbone ladder 1 is unfolded, the connecting rod structures are also unfolded, and the angles between the first connecting rods 4 and the second connecting rods 5 gradually increase until the angles between the first connecting rods 4 and the second connecting rods 5 are 180°. During the rotation and unfolding of the connecting rod structure, the second connecting rod 5 will press against the end of the latch stick 7 that passes through and out of the connecting sleeve 6. Since its cross section is provided to be arc-shaped, under the pressing of the second connecting rod 5, the latch stick 7 will retract into the connecting sleeve 6, and the latch stick 7 drives the moving rod 34 to retract into the transverse tube 2. The moving rod 34 drives the sliding rod 29 to pass into the second sliding groove 26 by means of the transition rod 33, and the second spring 32 is compressed to generate a rebound force. When the angle between the first connecting rod 4 and the second connecting rod 5 is 180°, the latch stick 7 is aligned with the insertion hole 8. Under the action of the rebound force of the second spring 32, the latch stick 7 and the driving structure move to restore to their original positions, and one end of the latch stick 7 that passes through and out of the connecting sleeve 6 is inserted into the insertion hole 8, thereby completing the fixation between the first connecting rod 4 and the second connecting rod 5. That is, the connecting rod structure is automatically locked after the herringbone ladder 1 is unfolded.

Embodiment 3

Figure 11:
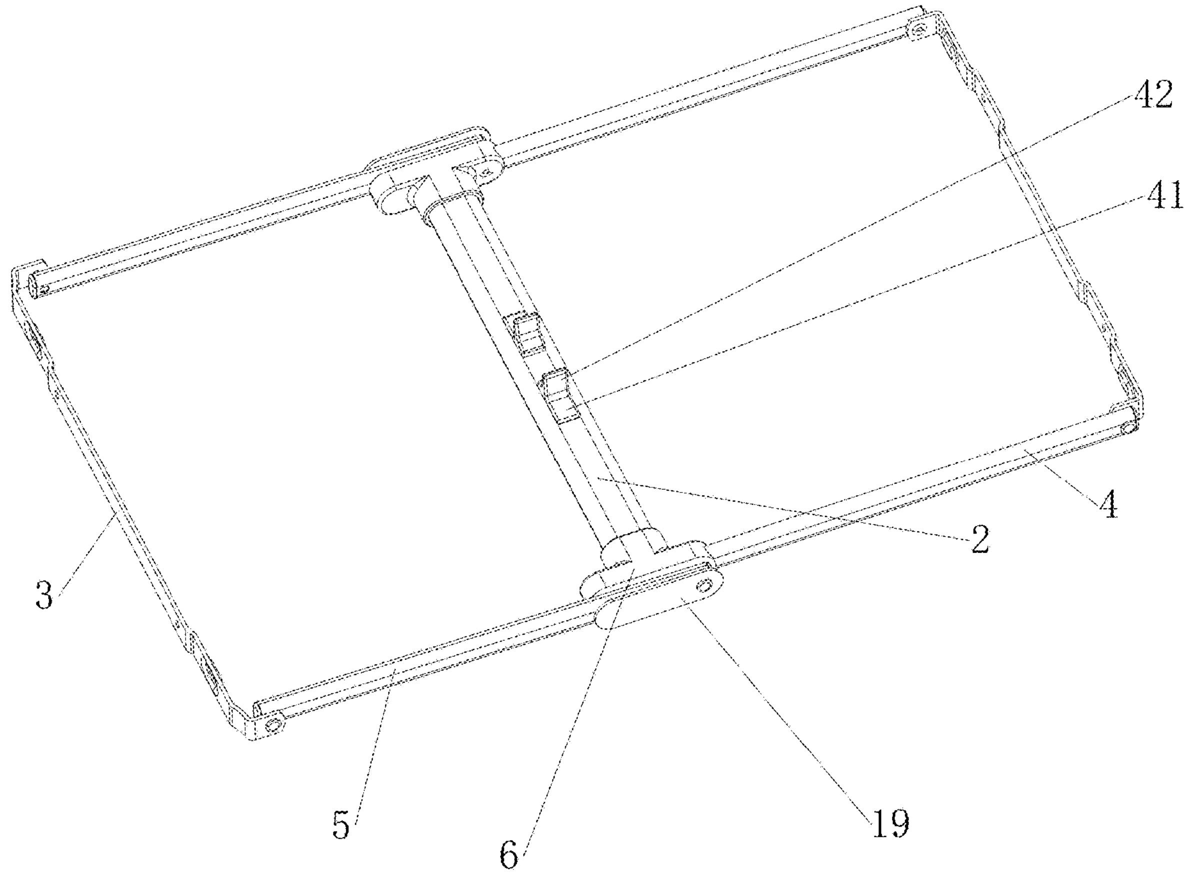
FIG. 11 is a schematic diagram of a connecting rod stabilizing structure of Embodiment 3.
Figure 12:
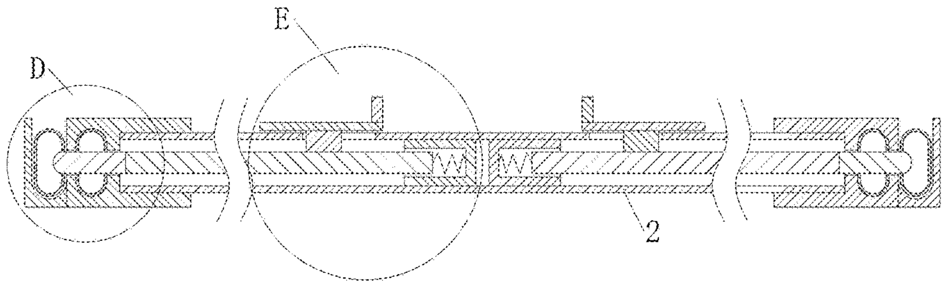
FIG. 12 is a partial cross-sectional view of the connecting rod stabilizing structure of Embodiment 3 in a side view.
Figure 13:
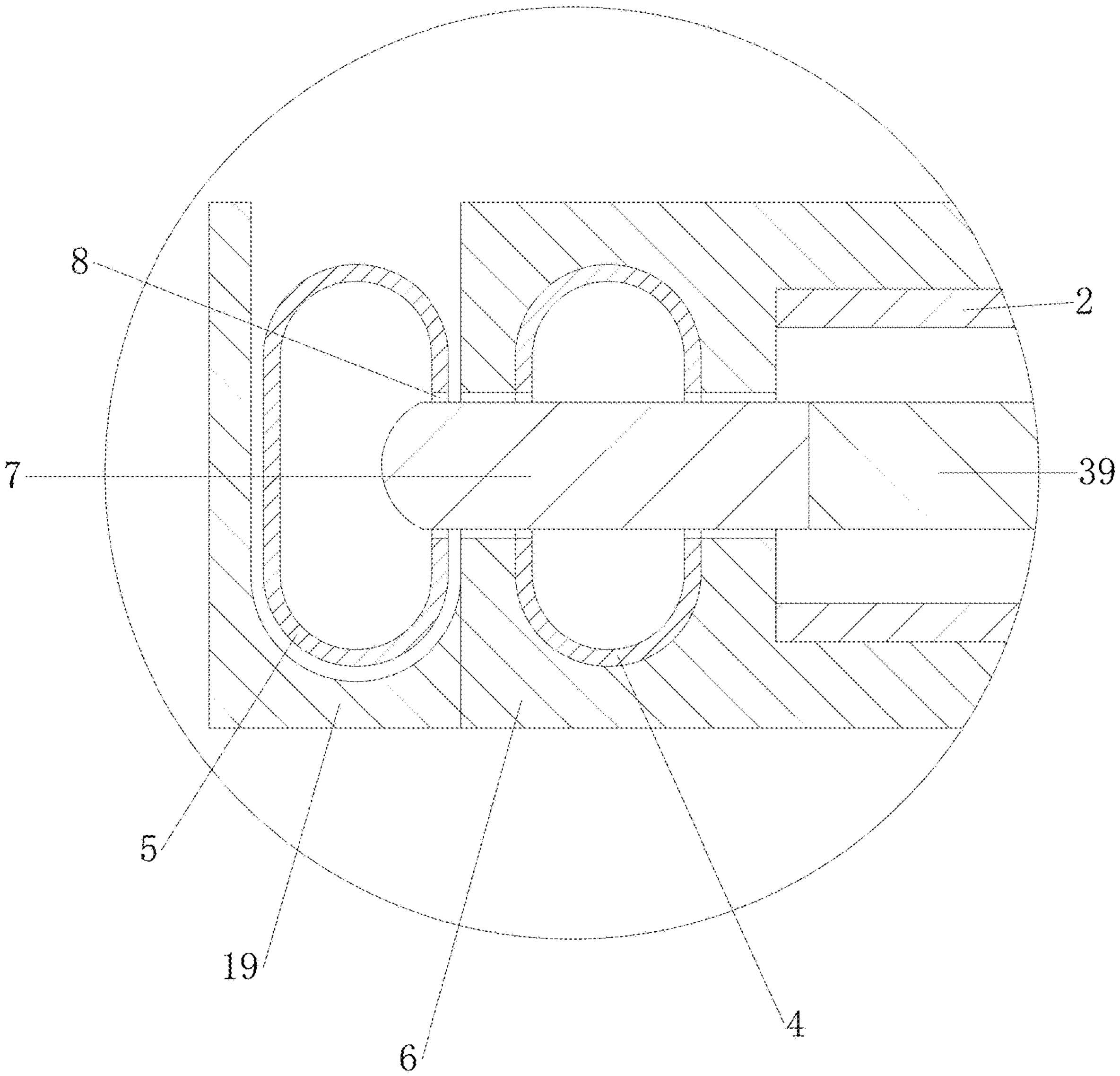
FIG. 13 is an enlarged view of part D in FIG. 12.
Figure 14:
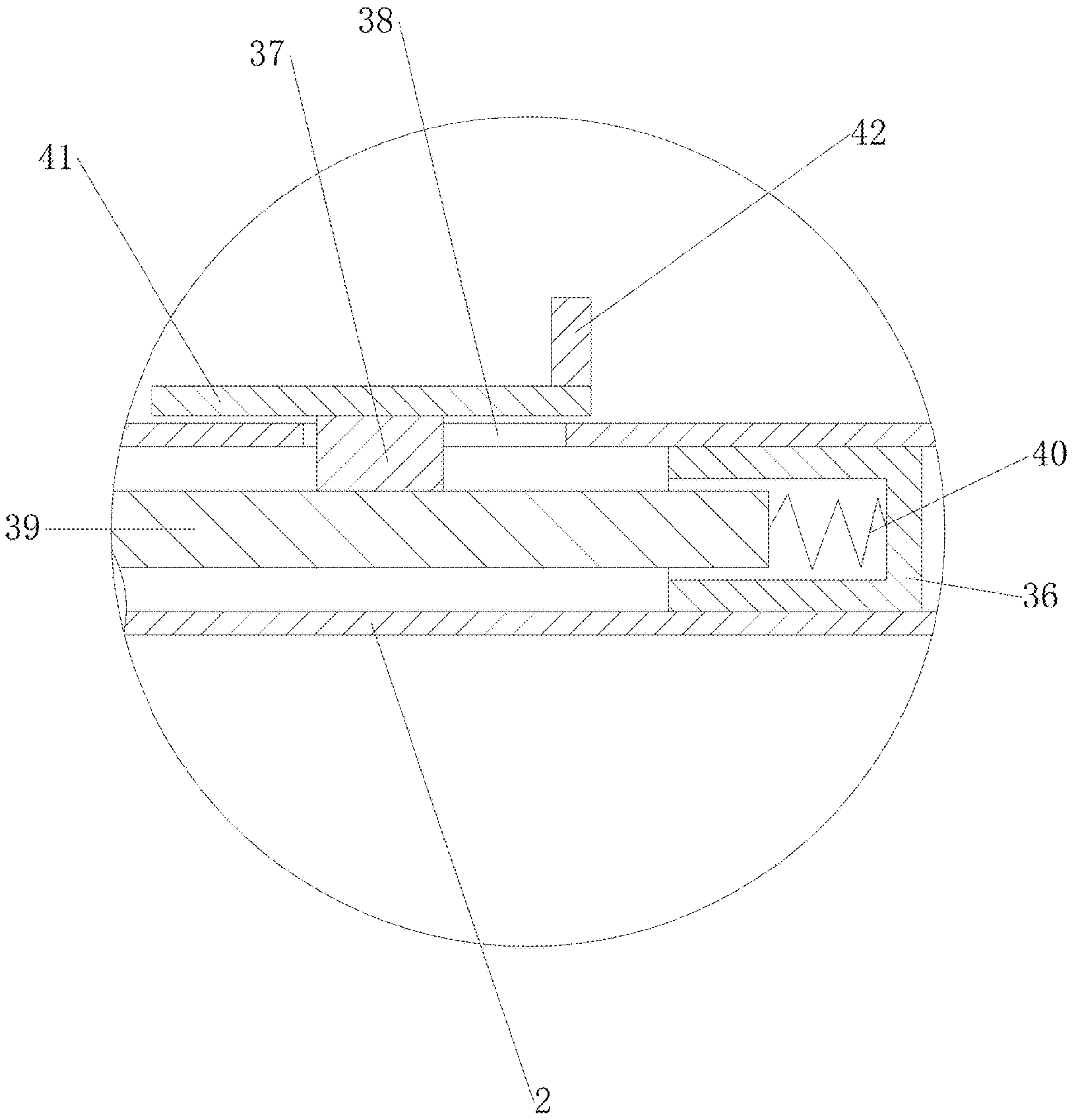
FIG. 14 is an enlarged view of part E in FIG. 12.

The difference from Embodiment 1 is that the driving structure no longer includes the first button 9, the pushing pole 10 and the two first driving assemblies. Instead, as shown in FIGS. 11 to 14, the driving structure is composed of two third driving assemblies that are symmetrically arranged front and back. The third driving assembly includes a mounting sleeve 36, a sliding block 37, a third sliding groove 38 and a pulling pole 39. The mounting sleeve 36 is fixed in the transverse tube 2. One end of the pulling pole 39 passes into the mounting sleeve 36 in a sliding connection manner, and a third spring 40 is fixedly connected between said end of the pulling pole and an inner bottom wall of the mounting sleeve 36. The other end of the pulling pole 39 passes through and out of the mounting sleeve 36 and is fixedly connected to the latch stick 7. The third sliding groove 38 is formed on an outer side wall of the transverse tube 2. The third sliding groove 38 extends transversely frontward and rearward and is in communication with the interior of the transverse tube 2. The sliding block 37 slides forward and backward along the third sliding groove 38. A bottom end of the sliding block 37 is fixedly connected to the pulling pole 39, and a top end of the sliding block 37 passes through and out of the transverse tube 2 through the third sliding groove 38 and is integrally formed with a sliding plate 41 for covering the third sliding groove 38. A vertical plate 42 is integrally formed at the top end of the sliding plate 41.

When the herringbone ladder 1 needs to be folded, the user pinches the two vertical plates 42 with fingers to move the two vertical plates 42 toward each other. Thus, the two sliding blocks 37 are moved toward each other through the sliding plates 41. The sliding block 37 slides along the third sliding groove 38. The sliding block 37 drives the pulling pole 39 to move into the mounting sleeve 36. The pulling pole 39 drives the latch stick 7 to retract into the connecting sleeve 6. In this case, the third spring 40 is compressed to generate a rebound force. In this way, the connecting rod structures can be unlocked, and when the herringbone ladder 1 is folded, the connecting rod structures are automatically folded. After the vertical plates 42 are released, the driving structure and the latch sticks 7 can be restored to their original positions under the rebound force of the third spring 40.

Similarly, when the herringbone ladder 1 is unfolded, the connecting rod structures are also unfolded, and the angles between the first connecting rods 4 and the second connecting rods 5 gradually increase until the angles between the first connecting rods 4 and the second connecting rods 5 are 180°. During the rotation and unfolding of the connecting rod structure, the second connecting rod 5 will press against the end of the latch stick 7 that passes through and out of the connecting sleeve 6. Since its cross section is provided to be arc-shaped, under the pressing of the second connecting rod 5, the latch stick 7 will retract into the connecting sleeve 6, and the latch stick 7 drives the pulling pole 39 to move into the mounting sleeve 36. The third spring 40 is compressed to generate a rebound force. When the angle between the first connecting rod 4 and the second connecting rod 5 is 180°, the latch stick 7 is aligned with the insertion hole 8. Under the action of the rebound force of the third spring 40, the latch stick 7 and the driving structure move to restore to their original positions, and one end of the latch stick 7 that passes through and out of the connecting sleeve 6 is inserted into the insertion hole 8, thereby completing the fixation between the first connecting rod 4 and the second connecting rod 5. That is, the connecting rod structure is automatically locked after the herringbone ladder 1 is unfolded.

In the description of the present invention, it should be noted that the orientation or position relationships indicated by terms "upper", "lower", "inner", "outer", "top/bottom end", and the like are based on the orientation or position relationships shown in the accompanying drawings, and are only for the convenience of describing the present invention and simplifying the description, rather than indicating or implying that the referred device or element must have a particular orientation or be constructed and operated in a particular orientation, and therefore should not be construed as limiting the present invention. In addition, terms "first" and "second" are used merely for descriptive purposes, and should not be construed as indicating or implying relative importance.

In the description of the present invention, it should be noted that, unless otherwise specified and limited, terms "installed", "provided", "sleeved/sheathed", "connected", and the like should be understood in a broad sense, for example, "connection" may be a fixed connection, a detachable connection, or an integral connection; may be a mechanical connection or an electrical connection; may be a direct connection or an indirect connection through an intermediate medium; or may be internal communication between two elements. For those of ordinary skill in the art, the specific meaning of the terms mentioned above in the present invention should be construed according to specific circumstances.

For those skilled in the art, it is apparent that the present invention is not limited to the details of the above-mentioned exemplary embodiments, and the present invention can be implemented in other specific forms without departing from the spirit or basic features of the present invention. Therefore, no matter from which point of view, the embodiments should all be regarded as exemplary and non-limiting. The scope of the present invention is defined by the appended claims rather than the above-mentioned description, and therefore it is intended that all changes which fall within the meaning and range of equivalency of the claims are embraced in the present invention. Any reference signs in the claims should not be construed as limiting the claims involved.

In addition, it should be understood that, although the specification is described according to implementations, not each of the implementations only contains one independent technical solution. This description of the specification is merely for the sake of clarity. Those skilled in the art should take the specification as a whole, and the technical solutions in the various embodiments may also be combined appropriately to form other implementations which can be understood by those skilled in the art.

The invention claimed is:

1. A connecting rod stabilizing structure for a herringbone ladder, comprising a transverse tube (2) and two connecting rod structures, wherein the two connecting rod structures are both hinged between two ladder bodies of the herringbone ladder and are symmetrically arranged front and back, the connecting rod structure comprises a first connecting rod (4) and a second connecting rod (5), ends of the first connecting rod (4) and the second connecting rod (5) which are away from each other are respectively hinged to the two ladder bodies of the herringbone ladder, the other end of the first connecting rod (4) is fixedly sleeved with a connecting sleeve (6), a latch stick (7) is slidably connected in the connecting sleeve (6), one end of the latch stick (7) passes through the first connecting rod (4) and passes through and out of the connecting sleeve (6) in a sliding connection manner and its cross section is provided to be arc-shaped, the other end of the second connecting rod (5) is rotatably connected to the connecting sleeve (6) and the first connecting rod (4) through a pin, the second connecting rod (5) is provided with an insertion hole (8) for inserting the end of the latch stick (7) that passes through and out of the connecting sleeve (6), the transverse tube (2) is connected between the two connecting sleeves (6) and is in communication with both connecting sleeves (6), and a driving structure is provided in the transverse tube (2) and the two connecting sleeves (6) for driving the two latch sticks (7) to retract into the connecting sleeves (6) at the same time and generating rebound forces on the latch sticks (7).

2. The connecting rod stabilizing structure for a herringbone ladder according to claim 1, wherein a positioning plate (19) for positioning the second connecting rod (5) is integrally formed on an outer side wall of the connecting sleeve (6).

3. The connecting rod stabilizing structure for a herringbone ladder according to claim 2, wherein the driving structure comprises a first button (9), a pushing pole (10) and two first driving assemblies, the two first driving assemblies are respectively located in the two connecting sleeves (6) and are symmetrically arranged front and back, the first driving assembly comprises a pushing block (11), a fixed sleeve (12) and a moving block (13), the fixed sleeve (12) is fixed in the connecting sleeve (6), one end of the latch stick (7) passes into the fixed sleeve (12) in a sliding connection manner and a first spring (14) is fixedly connected between said end of latch stick and an inner bottom wall of the fixed sleeve (12), the moving block (13) is located in the connecting sleeve (6) and is fixedly sleeved outside the latch stick (7), the moving block (13) is provided with a first inclined surface (15), the pushing block (11) is located in the connecting sleeve (6), the pushing block (11) is provided with a first sliding groove (16) extending transversely to the left and right, and is provided with a second inclined surface (17) matched with the first inclined surface (15), the pushing block (11) moves left and right along an inner side wall of the connecting sleeve (6), and is slidably sleeved outside the latch stick (7) through the first sliding groove (16), the pushing pole (10) moves left and right along an inner side wall of the transverse tube (2), and front and rear ends of the pushing pole (10) are respectively inserted into the two connecting sleeves (6) and are fixedly connected to the two pushing blocks (11) respectively, one end of the first button (9) is fixedly connected to the pushing pole (10), and the other end of the first button (9) passes through and out of the transverse tube (2) in a sliding connection manner.

4. The connecting rod stabilizing structure for a herringbone ladder according to claim 3, wherein first auxiliary springs (18) are fixedly connected between both ends of the pushing pole (10) and the inner side walls of the two connecting sleeves (6).

5. The connecting rod stabilizing structure for a herringbone ladder according to claim 2, wherein the driving structure comprises a second button (20), a fixed tubing (21), a mounting block (22) and two second driving assemblies, the fixed tubing (21) is fixedly sleeved at a middle position outside the transverse tube (2), an outer side wall of the fixed tubing (21) is provided with a first opening (23) which is in communication with the interior of the fixed tubing (21), the transverse tube (2) is provided with a second opening (24) which is in communication with the interior of the transverse tube (2) and is aligned with the first opening (23), the mounting block (22) is fixed inside the transverse tube (2), two mounting grooves (25) symmetrically arranged front and back are formed on one side of the mounting block (22) close to the second opening (24), groove walls of the two mounting grooves (25) which are on opposite sides are both provided with second sliding groove (26), one end of the second button (20) is located outside the fixed tubing (21), the other end of the second button (20) passes into the fixed tubing (21) through the first opening (23) in a sliding connection manner, the two second driving assemblies correspond to the two mounting grooves (25) respectively and are symmetrically arranged front and back, the second driving assembly includes a pressing bar (27), a rotating block (28) and a sliding rod (29), one end of the pressing bar (27) is fixedly connected to the second button (20), the other end of the pressing bar (27) is hinged to the rotating block (28), the other end of the rotating block (28) is rotatably connected between upper and lower groove walls of the mounting groove (25) through a rotating shaft, and is integrally formed with two rotating plates (30) that are spaced apart, ends of the two rotating plates (30) away from the rotating block (28) are both integrally formed with circular plates (31), one end of the sliding rod (29) passes into the second sliding groove (26) in a sliding connection manner, and a second spring (32) is fixedly connected between said end of the sliding rod and a bottom of the second sliding groove (26), the other end of the sliding rod (29) passes through and out of the second sliding groove (26) and is fixed with a transition rod (33), the other end of the transition rod (33) is fixed with a moving rod (34), the sliding rod (29), the transition rod (33) and the moving rod (34) are all arranged concentrically and coaxially, and the cross-sectional areas of the sliding rod (29) and the moving rod (34) are both larger than the cross-sectional area of the transition rod (33), the transition rod (33) passes through a space between the two circular plates (31) in a fitting manner, opposite sides of the sliding rod (29) and the moving rod (34) are both in contact with outer side walls of the circular plates (31), the two moving rods (34) are aligned with the two latch sticks (7) respectively, and one end of the moving rod (34) that is away from the transition rod (33) passes through and out of the mounting block (22) in a sliding connection manner, and passes into the connecting sleeve (6) and is fixedly connected to the latch stick (7).

6. The connecting rod stabilizing structure for a herringbone ladder according to claim 5, wherein a second auxiliary spring (35) located between two mounting grooves (25) is fixed on one side of the mounting block (22) close to the second opening (24), and the other end of the second auxiliary spring (35) is fixedly connected to the second button (20).

7. The connecting rod stabilizing structure for a herringbone ladder according to claim 2, wherein the driving structure is composed of two third driving assemblies that are symmetrically arranged front and back, the third driving assembly comprises a mounting sleeve (36), a sliding block (37), a third sliding groove (38) and a pulling pole (39), the mounting sleeve (36) is fixed in the transverse tube (2), one end of the pulling pole (39) passes into the mounting sleeve (36) in a sliding connection manner, and a third spring (40) is fixedly connected between said end of the pulling pole and an inner bottom wall of the mounting sleeve (36), the other end of the pulling pole (39) passes through and out of the mounting sleeve (36) and is fixedly connected to the latch stick (7), the third sliding groove (38) is formed on an outer side wall of the transverse tube (2), the third sliding groove (38) extends transversely forward and backward and is in communication with the interior of the transverse tube (2), the sliding block (37) slides forward and backward along the third sliding groove (38), a bottom end of the sliding block (37) is fixedly connected to the pulling pole (39), and a top end of the sliding block (37) passes through and out of the transverse tube (2) through the third sliding groove (38).

8. The connecting rod stabilizing structure for a herringbone ladder according to claim 7, wherein a sliding plate (41) for covering the third sliding groove (38) is integrally formed at the top end of the sliding block (37), and a vertical plate (42) is integrally formed at the top end of the sliding block (41).

* * * * *